United States Patent
Tamaki et al.

(10) Patent No.: US 6,780,346 B2
(45) Date of Patent: Aug. 24, 2004

(54) GALLIUM NITRIDE PHOSPHOR AND METHOD FOR PRODUCING IT

(75) Inventors: Hiroto Tamaki, Anan (JP); Masatoshi Kameshima, Anan (JP); Yoshitaka Sato, Mobara (JP)

(73) Assignees: Nichia Corporation, Tokushima (JP); Futaba Corporation, Chiba (JP)

( * ) Notice: Subject to any disclaimer, the term of this patent is extended or adjusted under 35 U.S.C. 154(b) by 265 days.

(21) Appl. No.: 10/120,403

(22) Filed: Apr. 12, 2002

(65) Prior Publication Data

US 2003/0034481 A1 Feb. 20, 2003

(30) Foreign Application Priority Data

Apr. 16, 2001 (JP) ........................................ 2001-117470

(51) Int. Cl.$^7$ .............................. H01B 1/06; C09K 11/08
(52) U.S. Cl. ...................... 252/301.4 R; 252/301.4 P; 252/301.6 P; 252/519.14; 252/521.5
(58) Field of Search ......................... 252/519.14, 521.5, 252/301.4 R, 301.4 P, 301.6 P; 428/403

(56) References Cited

U.S. PATENT DOCUMENTS

| | | | |
|---|---|---|---|
| 5,814,533 A | * | 9/1998 | Shakuda ....................... 438/46 |
| 6,069,440 A | * | 5/2000 | Shimizu et al. .............. 313/486 |
| 6,303,403 B1 | | 10/2001 | Sato et al. |

FOREIGN PATENT DOCUMENTS

| | | |
|---|---|---|
| JP | 51-41686 | 4/1976 |
| JP | 2001-49250 | 2/2001 |
| JP | 2002-309247 | * 10/2002 |

* cited by examiner

*Primary Examiner*—Mark Kopec
(74) *Attorney, Agent, or Firm*—Wenderoth, Lind & Ponack, L.L.P.

(57) ABSTRACT

A gallium nitride phosphor of which the particles are coated with a surface-treating compound that contains at least one of P and Sb.

21 Claims, 1 Drawing Sheet

GALLIUM NITRIDE PHOSPHOR AND METHOD FOR PRODUCING IT

This application is based on Application No. 117470 filed in Japan on Apr. 16, 2001, the content of which is incorporated hereunto by reference.

BACKGROUND OF THE INVENTION

The present invention relates to a gallium nitride phosphor usable in, for example, vacuum fluorescent display, field-emission displays (FED) and projection tubes, and relates to a method for producing it. In particular, the invention relates to such a gallium nitride phosphor of good luminescence and to a method for producing it.

Basically having a cathode and an anode opposite to it, vacuum fluorescent display and FED are flat panel displays which are so constituted that the fluorescent film disposed on the side of the anode therein is excited by electron rays to emit light. The acceleration voltage of the electron rays to excite the anode is generally at most 0.2 kV in vacuum fluorescent display, and approximately from 0.1 to 10 kV in FED. The level of this acceleration voltage in these is low, when compared with that in CRT of generally tens kV. Therefore, in general, phosphors capable of being excited by low-energy electron rays are used in vacuum fluorescent display and FED.

Except green-emitting ZnO:Zn phosphors, conventional phosphors that are excited by low-energy electron rays to emit light are phosphor particles coated with indium oxide having the ability to increase the electrical conductivity of the particles. The phosphors of this type include ZnS:Zn (blue), ZnS:Cu,Al (yellow green), ZnS:Au,Al (yellow green), (Zn,Cd)S:Au,Al (green yellow to yellow orange), and (Zn,Cd)S:Ag,Cl (orange to red orange). When excited by electron rays, however, these sulfide phosphors emit sulfide gas and decompose to scatter, and are therefore problematic in that they contaminate oxide filaments and their luminous efficiency often lowers. On the other hand, vacuum fluorescent display and FED are desired to have the function of displaying multi-color images, for which it is necessary to develop phosphors capable of being excited by low-energy electron rays to emit different colors. In that situation, it is desired to develop non-sulfide phosphors for emission of different colors and to make them fit for practical use.

One hopeful example of non-sulfide phosphors heretofore studied in the art is a gallium nitride phosphor. For example, JP-A 41686/1976 discloses a Zn or Cd-doped GaN phosphor. The method for obtaining the GaN phosphor disclosed therein comprises burning gallium oxide in an $NH_3$ gas atmosphere to nitride it. In this case, gallium oxide is nitrided from the surface of its particles, but it is difficult to completely nitride the gallium oxide particles and a non-reacted part remains in the processed particles. Therefore, when the gallium nitride phosphor obtained in the method is excited by low-energy electron rays to emit light, its luminescence is low and the phosphor could not be put into practical use for vacuum fluorescent display, etc. Even when other starting materials than gallium oxide such as gallium sulfide are used in producing gallium nitride, the products still have the same problem.

Given that situation, the present invention is to solve the problems noted above and to provide a gallium nitride phosphor of good luminescence.

The above and further objects and features of the invention will more fully be apparent from the following detailed description with accompanying drawings.

SUMMARY OF THE INVENTION

We, the present inventors have assiduously studied to solve the above-mentioned problems. As a result, we have found that a gallium nitride phosphor of good luminescence can be obtained by coating the phosphor particles with a surface-treating compound that contains at least one of P and Sb. On the basis of this finding, we have completed the present invention.

Accordingly, the gallium nitride phosphor of the invention is characterized in that its particles are coated with a surface-treating compound that contains at least one of P and Sb.

Preferably, the total of P and Sb in the surface-treating compound to coat the gallium nitride phosphor is from 0.0001 to 10.0 parts by weight relative to 100 parts by weight of the phosphor. If the amount of the surface-treating compound that coats the phosphor is smaller than 0.0001 parts by weight, the compound will be ineffective; but if larger than 10 parts by weight, the excess compound will interfere with the phosphor excitation and emission and will lower the phosphor luminescence.

The surface-treating compound that contains at least one of P and Sb is a phosphorus compound and an antimony compound, including, for example, phosphates and antimonates. In particular, phosphates realize better luminescence. They include, for example, alkali metal phosphates, alkaline earth metal phosphates, and gallium phosphate. Gallium phosphate is the most effective for improving the luminescence of the phosphor treated with it.

The gallium nitride phosphor that may be processed in the invention includes those of the following general formula:

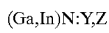
(Ga,In)N:Y,Z in which Y is at least one selected from Be, Zn, Mg, Ca, Sr, Ba, Cd and Hg; and Z is at least one selected from O, S, Se, Te, Pb, C, Si, Ge and Sn.

The gallium nitride phosphor further includes others of the following general formula:

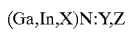
(Ga,In,X)N:Y,Z in which X is at least one of B and Al; Y is at least one selected from Be, Zn, Mg, Ca, Sr, Ba, Cd and Hg; and Z is at least one selected from O, S, Se, Te, Pb, C, Si, Ge and Sn.

Basically, any gallium nitride phosphor realizes the effect of the invention. In particular, those of the above-mentioned formulae realize extremely good luminescence.

One method for producing the gallium nitride phosphor of the invention comprises a coating step of bringing a surface-treating liquid that contains at least one of P and Sb into contact with the surface of a gallium nitride phosphor to thereby make the surface of the gallium nitride phosphor coated with the surface-treating compound that contains at least one of P and Sb, and a drying step of drying the phosphor coated with the surface-treating compound that contains at least one of P and Sb.

According to the method for producing the gallium nitride phosphor as above, the surface of the phosphor particles is coated with the surface-treating compound that contains at least one of P and Sb, and the luminescence of the thus-coated gallium nitride phosphor is enhanced. Excitable by low-energy electron rays to emit light of extremely high brightness, the coated gallium nitride phosphor of the invention is expected to be effective in vacuum fluorescent display, etc.

In the coating step, the surface-treating liquid to be used may contain Ga, in addition to at least one of P and Sb.

In the coating step, if desired, the gallium nitride phosphor to be coated may be put into the surface-treating liquid to form a phosphor slurry, then the pH of the phosphor slurry is controlled, and the surface of the phosphor particles may be coated with the surface-treating compound.

In the coating step, the gallium nitride phosphor may be added to the surface-treating liquid to form a phosphor slurry, and the phosphor slurry may be stirred. While stirred, the non-reacted gallium oxide that will remain in the surface of the gallium nitride phosphor particles immediately reacts with P and/or Sb in the surface-treating liquid. The reaction forms a surface-treating compound such as gallium phosphate or gallium antimonate on the surface of the phosphor particles. The phosphor particles are thus coated with the surface-treating compound.

The pH of the phosphor slurry prepared by putting the phosphor into a surface-treating liquid may be controlled to thereby make the phosphor particles coated with the surface-treating compound. In this method, the gallium ions having been released from the surface of the phosphor particles by controlling the pH of the phosphor slurry are reacted with P and/or Sb. Also in this method, the surface-treating compound such as gallium phosphate or gallium antimonate is formed on the surface of the phosphor particles.

The surface-treating liquid that contains at least one of P and Sb may be an aqueous solution of phosphoric acid, antimonic acid, phosphates, hydrogenphosphates, dihydrogenphosphates or antimonates. Aqueous solutions of phosphoric acid or phosphates are more preferred. Phosphoric acid is preferably orthophosphoric acid or pyrophosphoric acid. Phosphates are preferably soluble in water. For example, preferred are alkali metal phosphates such as ammonium phosphate, ammonium pyrophosphate, potassium phosphate, sodium phosphate.

The surface-treating liquid may be an aqueous solution that contains Ga in addition to at least one of P and Sb. To add Ga thereto, gallium chloride, gallium nitrate, gallium sulfate or the like Is added to and dissolved in the surface-treating liquid, or an aqueous solution of such a gallium compound is added to the surface-treating liquid. In the Ga-containing surface-treating liquid, Ga reacts with P and/or Sb therein and to coat phosphor particles.

Another method for producing the gallium nitride phosphor of the invention comprises mixing a surface-treating compound that contains at least one of P and Sb with a gallium nitride phosphor in a solvent to form a phosphor slurry, followed by drying the phosphor slurry to thereby make the phosphor particles coated with the surface-treating compound.

The surface-treating compound to be used in the method is preferably a phosphate or an antimonate, more preferably a phosphate. The phosphate may be soluble in water, such as alkali phosphates; or may be insoluble or hardly soluble in water, such as alkaline earth metal phosphates or gallium phosphate. For the surface-treating compound, gallium phosphate is the best. In case where the surface-treating compound is a water-insoluble or hardly water-soluble phosphate, it is desirable that the phosphate particles have a mean particle size of at most 0.5 $\mu$m. If the phosphate particles are larger than the range, a dense phosphate film could not be formed on the phosphor particles, and the surface-treating compound will be ineffective. The solvent may be water or an organic solvent such as methanol.

DETAILED DESCRIPTION OF THE INVENTION

Figure 1:
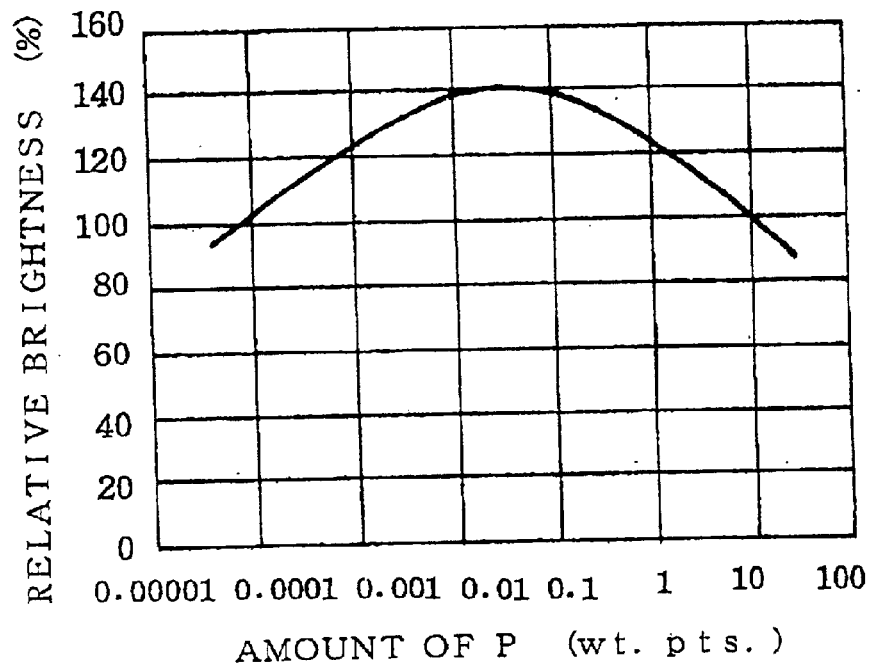
FIG. 1 is a graph showing the relationship between the relative brightness (%) of the gallium nitride phosphor of the invention and the amount of P (parts by weight) that coats the phosphor particles.

The gallium nitride phosphor of the invention is produced as follows: A starting material mixture prepared by mixing a gallium compound and a zinc compound is burned at 1000 to 1200° C. with $NH_3$ gas being introduced thereinto to form a gallium nitride phosphor. Next, the resulting phosphor is suspended in water, an aqueous solution of phosphoric acid, phosphate or the like is added thereto to form a surface-treating liquid. The resulting surface-treating liquid is stirred, and the phosphor particles therein are thereby coated with the surface-treating compound such as gallium phosphate. The phosphor thus coated with the surface-treating compound is then dried in the next drying step to remove water.

The phosphor particles may be coated with the surface-treating compound by controlling the pH of the surface-treating liquid. Concretely, the gallium nitride phosphor produced according to the same burning process as above is suspended in water, and an aqueous solution of phosphoric acid, phosphate or the like is added to the suspension to form a surface-treating liquid. With stirring, the pH of the phosphor slurry is controlled to be at least 3 by adding aqueous ammonia or the like thereto, and the phosphor particles are thereby coated with the surface-treating compound such as gallium phosphate. The phosphor thus coated with the surface-treating compound is then dried in the next drying step to remove water.

The surface-treating liquid may contain Ga. Concretely, the gallium nitride phosphor produced according to the same burning process as above is suspended in water, and an aqueous solution of phosphoric acid, phosphate or the like is added to the suspension along with an aqueous solution of gallium chloride or the like thereto to form a surface-treating liquid. With stirring, the pH of the phosphor slurry is controlled to be at least 3 by adding aqueous ammonia or the like thereto, and the phosphor particles are thereby coated with the surface-treating compound such as gallium phosphate. The phosphor thus coated with the surface-treating compound is then dried in the next drying step to remove water.

In still another method, the phosphor slurry may be dried to thereby make the phosphor particles coated with the surface-treating compound. Concretely, gallium phosphate or the like is added to the phosphor suspension in water or in an organic solvent, and stirred. The resulting phosphor slurry is then dried to thereby make the phosphor particles coated with the surface-treating compound such as gallium phosphate.

In vacuum fluorescent display, the gallium nitride phosphor is excited by low-energy electron rays of at most 0.2 kV to emit light. The depth of the low-energy electron rays to penetrate into each phosphor particle to excite the phosphor is approximately from 50 to 100 nm and is not so large. In these, therefore, most emission is from the surface of the phosphor particles. Non-reacted gallium oxide remains in the surface of conventional gallium nitride phosphor particles, and it lowers the luminescence of the phosphor.

The particles of the gallium nitride phosphor of the invention are coated with a surface-treating compound such as gallium phosphate. Therefore, the luminescence of the thus-coated phosphor of the invention is significantly improved. This is because the coated phosphor of the invention is free from the influence of the non-reacted part that lowers the phosphor luminescence. Uniformly coated with the surface-treating compound such as gallium phosphate, the gallium nitride phosphor particles of the invention have an increased effective luminescent area, and the luminescence thereof is thereby improved.

The luminescence of the coated gallium nitride phosphor of the invention varies, depending on the amount of the surface-treating compound that coats the phosphor. The luminescence change that depends on the coating amount of the surface-coating compound can be confirmed according to the test method mentioned below.

(1) A (Ga,In)N:Zn,S phosphor is suspended in water.

(2) An aqueous ammonium phosphate solution and an aqueous gallium chloride solution are added to the phosphor suspension to prepare a phosphor slurry, which contains the phosphor in the surface-treating liquid.

(3) The phosphor slurry is stirred, and aqueous ammonia is added thereto to thereby make the phosphor slurry have a pH of 4.0.

In this condition, gallium phosphate is formed in the phosphor slurry, and the phosphor particles are coated with it. When the amount of ammonium phosphate and gallium chloride to be added to the phosphor suspension is varied, the luminescence (relative brightness) of the coated gallium nitride phosphor is thereby varied. FIG. 1 shows the luminescence (relative brightness) of the coated gallium nitride phosphor that varies depending on the amount of P (parts by weight) that coats the phosphor particles. To measure its luminescence, the gallium nitride phosphor is excited by electron rays at an accelerating voltage of 0.5 kV and a current density of 0.5 $\mu A/cm^2$. The luminescence is in terms of the relative brightness (%) of the coated gallium nitride phosphor, based on the control brightness, 100%, of the non-processed gallium nitride phosphor, namely, the non-coated gallium nitride phosphor. The amount of P that coats the phosphor is in terms of parts by weight of the coating P relative to 100 parts by weight of the non-coated phosphor.

FIG. 1 confirms that the luminescence of the P-coated phosphor increases over that of the non-coated phosphor when the coating amount of P falls between 0.0001 and 10.0 parts by weight. In particular, it is understood that the luminescence of the coated phosphor is extremely high when the coating amount of P falls between 0.001 and 1.0 part by weight. Accordingly, when the phosphor is coated with gallium phosphate, the coating amount of P is preferably from 0.0001 to 10.0 parts by weight, more preferably from 0.001 to 1.0 part by weight, relative to 100 parts by weight of the phosphor.

Figure 2:
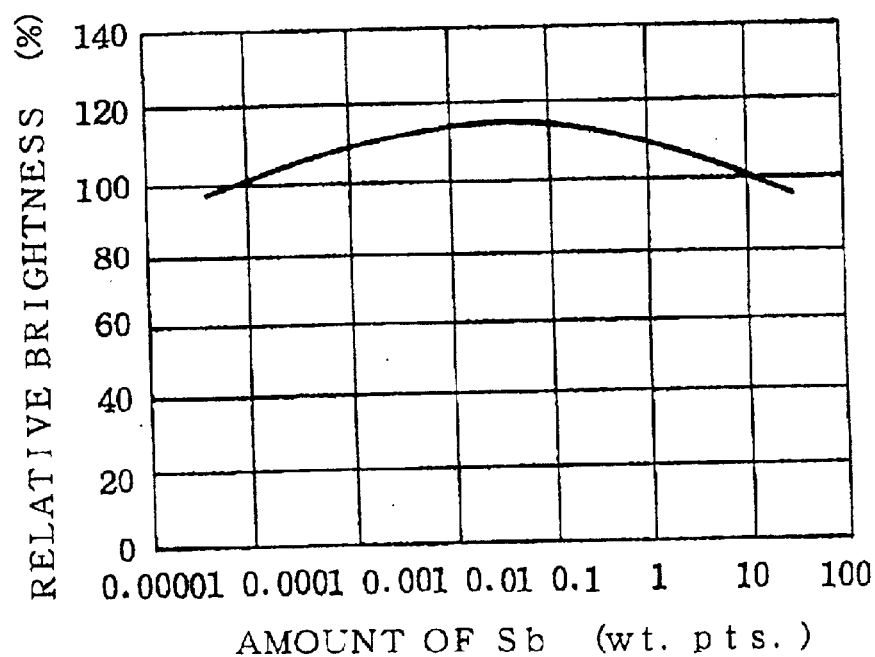
FIG. 2 is a graph showing the relationship between the relative brightness (%) of the gallium nitride phosphor of the invention and the amount of Sb (parts by weight) that coats the phosphor particles.

FIG. 2 shows the luminescence of a gallium nitride phosphor coated with an antimony compound, indicating that the luminescence of the coated phosphor varies depending on the coating amount of the antimony compound. The phosphor is produced as follows: A (Ga,In)N:Zn,S phosphor is suspended in water, and an aqueous antimony chloride solution is added thereto. With stirring, the pH of the phosphor slurry is controlled to be 5.0 by adding aqueous ammonia thereto, and the phosphor particles are thereby coated with the antimony compound. The amount of antimony chloride to be added to the phosphor suspension is varied, and the luminescence (relative brightness) of the coated gallium nitride phosphor of the invention is plotted relative to the coating amount of Sb (parts by weight), as in FIG. 2. To measure its luminescence, the phosphor is excited by electron rays at an accelerating voltage of 0.5 kV and a current density of 0.5 $\mu A/cm^2$. The luminescence is in terms of the relative brightness (%) of the coated gallium nitride phosphor, based on the control brightness, 100%, of the non-processed gallium nitride phosphor, namely, the gallium nitride phosphor not coated with the antimony compound. The amount of Sb that coats the phosphor is in terms of parts by weight of the coating Sb relative to 100 parts by weight of the non-coated phosphor. As in FIG. 2, it is understood that the luminescence of the Sb-coated phosphor is high when the coating amount of Sb falls between 0.0001 and 10.0 parts by weight, and in particular, the luminescence of the coated phosphor is extremely high when the coating amount of Sb falls between 0.001 and 1.0 part by weight.

EXAMPLES

Example 1

(1) Step of Producing Gallium Nitride Phosphor:

10 g of $Ga_2S_3$ powder, 1 g of $In_2S_3$ powder and 2 g of ZnS powder are well mixed, and the starting material mixture thus obtained is put into an alumina boat, and this is inserted into a quartz tube. Next, this is kept at 1100° C. for 3 hours with $NH_3$ gas being introduced thereinto at a flow rate of 1.5 liters/min, and then cooled. The alumina boat is taken out, and (Ga,In)N:Zn,S phosphoris obtained. The phosphor contains 170 ppm of In, 2130 ppm of Zn, and 190 ppm of S. The non-coated phosphor is surface-treated (coated) in the following step.

(2) Step of Coating the Phosphor with Surface-Treating Compound:

Coating Step with Surface-treating Compound:

5 g of the non-coated phosphor obtained in the previous step is suspended in 5 ml of water, and 5 g of an aqueous solution of 1 wt. % $(NH_4)_3PO_4$ and 5 g of an aqueous solution of 1 wt. % $GaCl_3$ are added to the suspension to form a phosphor slurry in which the phosphor is kept in contact with the surface-treating liquid. The phosphor slurry is stirred at room temperature, and aqueous ammonia is added thereto to thereby make the slurry have a pH of 4.0. In this condition, the phosphor particles are coated with the surface-treating compound.

Drying Step:

The phosphor coated with the surface-treating compound is separated from the phosphor slurry. This is dried to remove water. According to this process, gallium nitride phosphor particles coated with the surface-treating compound, gallium phosphate are produced. The coating amount of P in the phosphor coated with the surface-treating compound is 0.033 parts by weight relative to 100 parts by weight of the non-coated phosphor.

Example 2

In the same manner as in Example 1 except that $(NH_4)_4P_2O_7$ is used in place of $(NH_4)_3PO_4$, a gallium nitride phosphor coated with a surface-treating compound, gallium phosphate is produced. The amount of P in the coated phosphor is 0.029 parts by weight relative to 100 parts by weight of the non-coated phosphor.

Example 3

Coating Step with Surface-treating Compound:

5 g of the non-coated gallium nitride phosphor obtained in Example 1 is suspended in 5 ml of water, and 5 g of an aqueous solution of 1 wt. % $H_3PO_4$ is added thereto and stirred at room temperature to thereby make gallium ions released out of the phosphor particles. Next, aqueous ammonia is added to the phosphor slurry to thereby make the slurry have a pH of 4.0, and gallium phosphate is formed on the surface of the phosphor particles.

Drying Step:

The phosphor particles coated with gallium phosphate are separated and dried.

According to this process, gallium nitride phosphor particles coated with the surface-treating compound, gallium phosphate are produced. The amount of P in the coated phosphor is 0.029 parts by weight relative to 100 parts by weight of the non-coated phosphor.

Example 4

In the same manner as in Example 3 except that $H_4P_2O_7$ is used in place of $H_3PO_4$, a coated gallium nitride phosphor is produced. The amount of P in the phosphor is 0.026 parts by weight relative to 100 parts by weight of the non-coated phosphor.

Example 5

Coating Step with Surface-treating Compound:

5 g of the non-coated phosphor obtained in Example 1 is suspended in 5 ml of water, and 5 g of an aqueous solution of 1 wt. % $H_3PO_4$ is added thereto and stirred at room temperature to thereby make the phosphor particles coated with gallium phosphate.

Drying Step:

The phosphor is separated from the suspension and dried.

According to this process, gallium nitride phosphor particles coated with the surface-treating compound, gallium phosphate are produced. The amount of P in the coated phosphor is 0.018 parts by weight relative to 100 parts by weight of the non-coated phosphor.

Example 6

5 g of the non-coated phosphor obtained in Example 1 is suspended in 5 ml of water, and $GaPO_4$, having a mean particle size of 0.1 $\mu$m is added thereto and stirred at room temperature. All of the resulting phosphor slurry is dried, and a gallium nitride phosphor coated with gallium phosphate is produced. The amount of P in the phosphor is 0.095 parts by weight relative to 100 parts by weight of the non-coated phosphor.

Example 7

Coating Step:

5 g of the non-coated phosphor obtained in Example 1 is suspended in 5 ml of water, and 5 g of an aqueous solution of 1 wt. % $SbCl_3$ is added thereto. While the resulting phosphor slurry is stirred at room temperature, aqueous ammonia is added thereto to make the slurry have a pH of 5.0. In this step, the phosphor particles are coated with the surface-treating antimony compound.

Drying Step:

The phosphor is separated from the slurry and dried.

According to this process, gallium nitride phosphor particles coated with the antimony compound are produced. The amount of Sb in the coated phosphor is 0.030 parts by weight relative to 100 parts by weight of the non-coated phosphor.

Example 8

Coating Step:

5 g of the non-coated phosphor obtained in Example 1 is suspended in 5 ml of water, and 2.5 g of an aqueous solution of 1 wt. % $H_3PO_4$ and 2.5 g of an aqueous solution of 1 wt. % $SbCl_3$ are added thereto. While the resulting phosphor slurry is stirred at room temperature, aqueous ammonia is added thereto to make the slurry have a pH of 5.0. In this step, the phosphor particles are coated with the surface-treating compound.

Drying Step:

The phosphor is separated and dried. Accordingly, gallium nitride phosphor particles coated with gallium phosphate and the antimony compound are produced. The amount of P and Sb in the coated phosphor is 0.020 parts by weight and 0.015 parts by weight, respectively, relative to 100 parts by weight of the non-coated phosphor.

Example 9

A non-coated gallium nitride phosphor (Ga,In,B)N:Zn,S is prepared in the same manner as in Example 1 except that 0.003 g of an additional material $H_3BO_3$ is added to the starting material mixture. The phosphor contains 170 ppm of In, 20 ppm of B, 2050 ppm of Zn, and 180 ppm of S.

Next, the phosphor is coated with gallium phosphate also in the same manner as in the coating step and the drying step in Example 1 to obtain a coated gallium nitride phosphor. The amount of P in the coated phosphor is 0.029 parts by weight relative to 100 parts by weight of the non-coated phosphor.

Example 10

A non-coated gallium nitride phosphor (Ga,In,Al)N:Zn,S is prepared in the same manner as in Example 1 except that 0.002 g of an additional material $Al(OH)_3$ is added to the starting material mixture. The phosphor contains 160 ppm of In, 20 ppm of Al, 2080 ppm of Zn, and 190 ppm of S.

Next, the phosphor is coated with gallium phosphate also in the same manner as in the coating step and the drying step in Example 1 to obtain a coated gallium nitride phosphor. The amount of P in the coated phosphor is 0.031 parts by weight relative to 100 parts by weight of the non-coated phosphor.

Example 11

A non-coated gallium nitride phosphor (Ga,In,B,Al)N:Zn,S is prepared in the same manner as in Example 1 except that additional materials, 0.003 g of $H_3BO_3$ and 0.001 g of $Al(OH)_3$ are added to the starting material mixture. The phosphor contains 150 ppm of In, 20 ppm of B, 10 ppm of Al, 2100 ppm of Zn, and 160 ppm of S.

Next, the phosphor is coated with gallium phosphate also in the same manner as in the coating step and the drying step in Example 1 to obtain a coated gallium nitride phosphor. The amount of P in the coated phosphor is 0.035 parts by weight relative to 100 parts by weight of the non-coated phosphor.

The phosphors produced in Examples 1 to 11 are analyzed for the surface structure through X-ray photoelectron spectroscopy (XPS). XPS is to count and identity the number and the type of the elements existing in the surface of a solid substance by exposing the solid substance to X rays followed by measuring the energy intensity of the photoelectrons released from the solid surface by the photoelectron effect, and this is suitable for surface analysis of solid substances. With a spectroscope of high energy resolution, XPS gives the information relating to the bonding condition of the elements that exist in the surface of a solid substance. Using SHIMADZU ESCA 1000A (by Shimadzu Seisakusho) as the device for XPS, the phosphor particle surface layer (to a depth of from 0 to 100 angstroms in terms of the thickness of the surface layer) is analyzed for the bonding condition of Ga and P atoms existing therein. It has been confirmed that the phosphor particles are coated with gallium phosphate.

Using Rigaku RINT ULTIMA+ as the device for X-ray diffractometry, the phosphors are analyzed. The phosphors coated thick give diffraction patterns of gallium nitride and gallium phosphate.

The gallium nitride phosphors obtained in Examples 1 to 11 are excited by low-energy electron rays, and their luminance (relative brightness) and chromaticity x, y are given in Table 1. In measuring them, the accelerating voltage is 0.5 kV and the current density is 0.5 $\mu A/cm^2$. Table 1 confirms that the gallium nitride phosphor particles coated with a surface-treating compound that contains at least one of P and Sb emit bright light.

TABLE 1

|  | Surface Treatment (coating) | Amount of P (wt. pts.) | Amount of Sb (wt. pts.) | x | y | Relative Brightness % |
| --- | --- | --- | --- | --- | --- | --- |
| Example 1 | before treated | — | — | 0.174 | 0.139 | 100 |
|  | after treated | 0.033 | — | 0.172 | 0.135 | 140 |
| Example 2 | after treated | 0.029 | — | 0.173 | 0.136 | 130 |
| Example 3 | after treated | 0.029 | — | 0.173 | 0.136 | 120 |
| Example 4 | after treated | 0.026 | — | 0.172 | 0.135 | 125 |
| Example 5 | after treated | 0.018 | — | 0.172 | 0.135 | 140 |
| Example 6 | after treated | 0.095 | — | 0.172 | 0.135 | 125 |
| Example 7 | after treated | — | 0.030 | 0.172 | 0.135 | 115 |
| Example 8 | after treated | 0.020 | 0.015 | 0.172 | 0.135 | 120 |
| Example 9 | before treated | — | — | 0.173 | 0.136 | 115 |
|  | after treated | 0.029 | — | 0.173 | 0.136 | 140 |
| Example 10 | before treated | — | — | 0.173 | 0.137 | 115 |
|  | after treated | 0.031 | — | 0.173 | 0.137 | 135 |
| Example 11 | before treated | — | — | 0.174 | 0.137 | 120 |
|  | after treated | 0.035 | — | 0.174 | 0.136 | 145 |

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A gallium nitride phosphor of which the particles are coated with a surface-treating compound that contains at least one of P and Sb.

2. The gallium nitride phosphor according to claim 1, which is for vacuum fluorescent display.

3. The gallium nitride phosphor according to claim 1, which is for FED.

4. The gallium nitride phosphor according to claim 1, which is for projection tubes.

5. The gallium nitride phosphor according to claim 1, wherein the total of P and Sb is from 0.0001 to 10.0 parts by weight relative to 100 parts by weight of the phosphor.

6. The gallium nitride phosphor according to claim 1, wherein the amount of P is from 0.0001 to 1.0 part by weight relative to 100 parts by weight of the phosphor.

7. The gallium nitride phosphor according to claim 1, wherein the amount of P is from 0.001 to 1.0 part by weight relative to 100 parts by weight of the phosphor.

8. The gallium nitride phosphor according to claim 1, wherein the amount of Sb is from 0.0001 to 1.0 part by weight relative to 100 parts by weight of the phosphor.

9. The gallium nitride phosphor according to claim 1, wherein the amount of Sb is from 0.001 to 1.0 part by weight relative to 100 parts by weight of the phosphor.

10. The gallium nitride phosphor according to claim 1, wherein the surface-treating compound is a phosphorus compound.

11. The gallium nitride phosphor according to claim 10, wherein the surface-treating compound is a phosphate.

12. The gallium nitride phosphor according to claim 11, wherein the surface-treating compound is gallium phosphate.

13. The gallium nitride phosphor according to claim 1, wherein the surface-treating compound is an antimony compound.

14. The gallium nitride phosphor according to claim 1, wherein the phosphor is represented by the following general formula:

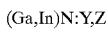
(Ga,In)N:Y,Z in which Y is at least one selected from Be, Zn, Hg, Ca, Sr, Ba, Cd and Hg; and Z is at least one selected from O, S, Se, Te, Pb, C, Si, Ge and Sn.

15. The gallium nitride phosphor according to claim 1, wherein the phosphor is represented by the following general formula:

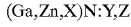
(Ga,Zn,X)N:Y,Z in which X is at least one of B and Al; Y is at least one selected from Be, Zn, Mg, Ca, Sr, Ba, Cd and Hg; and Z is at least one selected from 0, S, Se, Ta, Pb, C, Si, Ge and Sn.

16. A method for producing a gallium nitride phosphor, which comprises:

a coating step of bringing a surface-treating liquid that contains at least one of P and Sb into contact with the surface of a gallium nitride phosphor to thereby make the surface of the gallium nitride phosphor coated with the surface-treating compound that contains at least one of P and Sb, and a drying step of drying the phosphor coated with the surface-treating compound that contains at learnt one of P and Sb.

17. The method for producing a gallium nitride phosphor according to claim 16, wherein, in the coating step, the gallium nitride phosphor is added to the surface-treating liquid to form a phosphor slurry, and the pH of the phosphor slurry is controlled to thereby make the phosphor particles coated with the surface-treating compound that contains at learnt one of p and Sb.

18. The method for producing a gallium nitride phosphor according to claim 16, wherein the surface-treating liquid to be contacted with the gallium nitride phosphor in the coating step contains Ga in addition to at least one of P and Sb.

19. The method for producing a gallium nitride phosphor according to claim 18, wherein, in the coating step, the gallium nitride phosphor is put into the surface-treating liquid that contains at least one of P and Sb and additionally contains Ga to form a phosphor slurry, and the pH of the phosphor slurry is controlled to thereby make the phosphor particles coated with the surface-treating compound that contains at least one of P and Sb.

20. A method for producing a gallium nitride phosphor, which comprises mixing a surf ace-treating compound that contains at least one of P and Sb with a gallium nitride phosphor in a solvent to form a phosphor slurry, followed by drying the phosphor slurry to thereby make the phosphor particles coated with the surface-treating compound that contains at least one of P and Sb.

21. The method for producing a gallium nitride phosphor according to claim 20, wherein the surface-treating compound is gallium phosphate.

\* \* \* \* \*